United States Patent [19]
Ensz et al.

[11] Patent Number: 6,100,893
[45] Date of Patent: Aug. 8, 2000

[54] CONSTRUCTING SOLID MODELS USING IMPLICIT FUNCTIONS DEFINING CONNECTIVITY RELATIONSHIPS AMONG LAYERS OF AN OBJECT TO BE MODELED

[75] Inventors: Mark T. Ensz, Albuquerque, N. Mex.; Mark A. Ganter, Edmonds, Wash.; Chek T. Lim, Seattle, Wash.; Duane W. Storti, Seattle, Wash.; George M. Turkiyyah, Seattle, Wash.

[73] Assignee: Light Sciences Limited Partnership, Issaquah, Wash.

[21] Appl. No.: 08/862,216

[22] Filed: May 23, 1997

Related U.S. Application Data

[60] Provisional application No. 60/018,281, May 24, 1996, provisional application No. 60/018,278, May 24, 1996, provisional application No. 60/018,292, May 24, 1996, provisional application No. 60/018,280, May 24, 1996, provisional application No. 60/018,279, May 24, 1996, and provisional application No. 60/019,075, Jun. 3, 1996.

[51] Int. Cl.[7] .................................................. G06T 17/00
[52] U.S. Cl. ........................................ 345/420; 345/441
[58] Field of Search ................................... 345/429, 420, 345/424, 441

[56] References Cited

U.S. PATENT DOCUMENTS

| | | | |
|---|---|---|---|
| 4,933,889 | 6/1990 | Meshkat et al. | 364/578 |
| 5,522,019 | 5/1996 | Bala et al. | 345/424 |
| 5,542,036 | 7/1996 | Schroeder et al. | 345/424 |
| 5,559,935 | 9/1996 | Itoh et al. | 345/424 |
| 5,617,322 | 4/1997 | Yokota | 364/468.04 |
| 5,774,696 | 6/1998 | Akiyama | 395/500 |

OTHER PUBLICATIONS

Turner, J; Accurate Solid Modeling Using Polyhedral Approximations; IEEE Computer Graphics & Applications; pp. 14–28, 1988.

Herman, G. et al.; Shape–based Interpolation; IEEE Computer Graphics & Applications; pp. 69–79, May 1992.

Lavender, D. et al.; Voroni Diagrams of Set–Theoretic Solid Models; IEEE Computer Graphics & Applications; pp. 69–77, Sep. 1992.

Zhou, J.M. et al.; Automatic Creation of 3D Meshes for Complicated Solids; IEEE Transactions on Magnetics, vol. 28, No. 2; pp. 1759–1762, Mar. 1992.

Barequet, G., et al., *Piecewise–Linear Interpolation Between Polygonal Slices*, Proceedings of the Tenth Annual Symposium on Computational Geometry, pp. 93–102. ACM Press, Jun. 1994.

(List continued on next page.)

*Primary Examiner*—Mark K. Zimmerman
*Assistant Examiner*—Albert K. Lee
*Attorney, Agent, or Firm*—Ronald M. Anderson

[57] ABSTRACT

A solid model is constructed from surface point data that represent layers of an object. The model is represented as the level set of an implicit function that is fitted to the surface point data. In the two-dimensional application of the technique, a Delaunay triangulation is performed for each layer. In this step, surface points are connected to form Delaunay triangles; the data points are the vertices of the Delaunay triangles. A circumcircle is then created around each Delaunay triangle, passing through the three vertices of the triangle. To decimate the circumcircle data, overlapping circumspheres are merged according to a merging criterion. A pseudo-union of implicit functions for the reduced number of circumcircles provides an initial implicit function for the layer. Errors in the implicit function are substantially reduced by optimizing the position and/or radii of the circumcircles. The implicit functions for a plurality of adjacent layers are blended to define an implicit function for the object that is used for reconstruction or modeling of the object. The technique is generally extended to n dimensional objects by using simplices instead of the Delaunay triangles and hyperspheres instead of the circumcircles. The method is capable of constructing solid models with highly localized surface curvature.

24 Claims, 11 Drawing Sheets

OTHER PUBLICATIONS

Blechschmidt, J.L., et al., *The Use of Algebraic Functions as a Solid Modeling Alternative: An Investigation*, Advances in Design Automation: Computer–Aided and Computational Design, vol. DE–23(1), 1990, pp. 33–41.

Blinn, J.F., *A Generalization of Algebraic Surface Drawing*, ACM Transactions on Graphics, vol. 1, No. 3, Jul. 1982, pp. 235–256.

Bloomenthal, J., *An Implicit Surface Polygonizer*. Graphic Gems IV, P.S. Heckbert, editor, AP Professionsl, Cambridge, Massachusetts, 1994, pp. 324–349.

Blum, H., *A Transformation for Extracting New Descriptors of Shape*. Models for the Perception of Speech and Visual Form, W. Wathen–Dunn, editor, MIT Press, 1967, pp. 362–381.

Boissonnat, J.D., *Geometric Structures for Three–Dimensional Shape Representation*, ACM Transactions on Graphics, 3(4), 1984, pp. 266–286.

Boissonnat, J.D., *Shape Reconstruction from Planar Cross Sections*, Computer Vision, Graphics, and Image Processing, vol. 44, Oct. 1988, pp. 1–29.

Boult, T.E., et al., *Recovery of Superquadrics from Depth Information*, Proceedings of Workshop on Spatial Reasoning and Multi–Sensor Fusion, 1987, pp. 128–137.

Chiang, C.S., et al., *How to Compute Offsets Without Self–Intersection*, Curves and Surfaces in Computer Vision and Graphics II, SPIE, vol. 1610, 1991.

Chou, J.J., *Voronoi Diagrams for Planar Shapes*. IEEE Computer Graphics and Applications, 15(2), Mar. 1995, pp. 52–59.

Christiansen, H., et al., *Conversion of Complex Contour Line Definitions Into Polygonal Element Mosaics*, Computer Graphics, 12(3), 1978, pp. 187–192.

Danielsson, P.E., *Euclidean Distance Mapping*, Computer Graphics and Image Processing, 14, 1980, pp. 227–248.

DeRose, T., et al., *Geometric Continuity, Shape Parameters, and Geometric Constructions for Catmull–Rom Splines*, ACM Transactions on Graphics, 7(1), 1988, pp. 1–41.

Dobkin, D.P., et al., *Primitives for the Manipulation of Three–Dimensional Subdivisions*, Algorithmica, vol. 4, 1989, pp. 3–32.

Dong, Y., et al., *Building Solid Models From Serial Contour Images*, Proceedings of the SPIE–Image and Video Processing III, vol. 2421, San Jose, California, USA, 9–10 Feb. 1995, pp. 152–160.

Dutta, D., et al., *On the Skeleton of Simple CSG Objects*, ASME Journal of Mechanical Design, 115(1), 1992, pp. 87–94.

Edelsbrunner, H., et al., *Three–Dimensional Alpha Shapes*, ACM Transactions on Graphics, 13(1), 1994, pp. 43–72.

Ensz, M.T., et al., *Implicit Function Alteration Via Radius Mapping and Direct Function Modification*, ASME Advances in Design Automation, DE–vol. 82–1, 1995, pp. 57–64.

Ferrie, F.P., *Recovery of Volumetric Object Descriptions From Laser Rangefinder Images*, Proceedings of Computer Vision, ECCV 90, Antibes, France, 1990, pp. 387–396.

Foley, T.A., et al., *Advances in Scattered Data Interpolation*, Surveys on Mathematics for Industry, 4(2), 1994, pp. 71–84.

Franke, R., et al., *Scattered Data Interpolation and Applications: A Tutorial and Survey*, Geometric Modeling, Methods and Applications, Boblingen, Germany, Jun. 1990, pp. 131–160.

Fuchs, H., et al., *Optimal Surface Reconstruction From Planar Contours*, Communications of the ACM, vol. 20, No. 10, Oct. 1997, pp. 693–702.

Ganapathy, S., et al., *A New General Triangulation Method for Planar Contours*, Computer Graphics, 16(3), 1982, pp. 69–75.

Ganter, M.A., et al., *On Algebraic Methods for Implicit Swept Solids with Finite Extent*, Advances in Design Automation, DE–vol. 65–2, vol. 2, Albuquerque, New Mexico, Sep. 1993, pp. 389–396.

Gelston, S.M., et al., *Boundary Surface Recovery From Skeleton Curves and Surfaces*, Computer Aided Geometric Design, 12(2), 1995, pp. 27–51.

Gursoy, H.N., et al., *An Automated Coarse And Fine Surface Mesh Generation Scheme Based On Medial Axis Transform: Part I Algorithms*, Engineering with Computers, 8(3), 1992, pp. 121–137.

Hoffman, C.M., *How to Construct the Skeletons of CSG Objects*, Proceedings of the Fourth IMA Conference: The Mathematics of Surfaces, A. Bowyer and J. Davenport, editors, pp. 77–88. Oxford University Press, 1994.

Hoffman, C.M., *Constrained Surface Computations and Applications in Geometric Modeling*, Workshop on Computational Geometry, World Scientific Publishing Co., 1993, pp. 175–200.

Hoppe, H., et al., *Mesh Optimization*, Computer Graphics Proceedings, SIGGRAPH '93, pp. 19–26, Annual Conference Series, 1993, pp. 19–26.

Hoppe, H., et al., *Surface Reconstruction From Unorganized Points*, Computer Graphics, SIGGRAPH '92, 1992, pp. 71–78.

Hsieh, Y.C., et al., *Reconstruction of Sculptured Surfaces Using Coordinate Measuring Machines*, Advances in Design Automation, DE–vol. 65–2, ASME, vol. 2, Albuquerque, New Mexico, USA, 1993, pp. 35–46.

Keppel, E., *Approximating Complex Surfaces by Triangulation of Contour Lines*, IBM Journal of Research and Development, vol. 19, Jan. 1975, pp. 2–11.

Kumar, V., et al., *An Assessment of Data Formats for Layered Manufacturing*, Advances in Engineering Software, Report No. UM–MEAM–95–22, University of Michigan (1995).

Lee, D.T., *Medial Axis Transformation of a Planar Shape*, IEEE Transactions of Pattern Analysis and Machine Intelligence, vol. PAMI–4, No. 4, Jul. 1982, pp. 363–369.

Leymarie, F., et al., *Simulating the Grassfire Transform Using an Active Contour Model*, IEEE Transactions on Pattern Analysis and Machine Intelligence, vol. 14, No. 1, Jan. 1992, pp. 56–75.

Lim, C.T., et al., *Algebraic Computer Aided–Design with Maple V 2*, Mathematical Computation with Maple V: Ideas and Applications, Proceedings of the Maple Summer Workshop and Symposium, T. Lee, editor, University of Michigan, Ann Arbor, Jun. 28–30, 1993, Boston, Massachusetts, USA, 1993, pp. 169–175.

Lim, C.T., et al., *Implicit Reconstruction of Solids from Cloud Point Sets*, Third Symposium on Solid Modeling and Applications, C. Hoffman and J. Rossignac, editors, ACM Press, Salt Lake City, Utah, 1995, pp. 393–402.

Lim, C.T., et al., *Object Reconstruction From Layered Data Using Implicit Solid Modeling*, Journal of Manufacturing Systems, vol. 16, No. 4, 1977, pp. 1–13.

Lin, W.C., et al., *A New Surface Interpolation Technique for Reconstructing 3D Objects from Serial Cross–Sections*, Computer Vision, Graphics, and Image Processing, vol. 48, 1989, pp. 124–143.

Macworld Website, *Research Systems' Visible Human CD [PMAC]*, Nov. 1995, 1pg, http://www.macworld.com/pages/november.95/newproducts.1295.html.

Meshkat, S.N., et al., *Voronoi Diagram for Multiply–Connected Polygonal Domains II: Implementation and Application*, IBM Journal of Research and Development, vol. 31, No. 3, 1987, pp. 373–381.

Middleditch, A.E., et al., *Blend Surfaces for Set Theoretic Volume Modelling Systems*, Computer Graphics (SIGGRAPH '85 Proceedings), B.A. Barsky, editor, vol. 19, No. 3, Jul. 1985, pp. 161–170.

Muraki, S., *Volumetric Shape Description of Range Data Using "Blobby Model."* Computer Graphics (SIGGRAPH '91 Proceedings), vol. 25, No. 4, Jul. 1991, pp. 227–235.

Nackman, L.R., *Curvature Relations in Three–Dimensional Symmetric Axes*, Computer Graphics and Image Processing, vol. 20, 1982, pp. 43–57.

Nackman, L.R., et al., *Three–Dimensional Shape Description Using the Symmetric Axis Transform I: Theory*, IEEE Transactions on Pattern Analysis and Machine Intelligence, vol. PAMI–7(2), pp. 187–202.

Patrikalakis, N.M., et al., *Feature Extraction from B–Spline Marine Propeller Representations*, Journal of Ship Research, 36(3), Sep. 1992, pp. 233–247.

Patrikalakis, N.M., et al., *Shape Interrogation by Medial Axis Transform*, Advances in Design Automation: Computer–Aided and Computational Design, ASME, vol. 1, 1990, pp. 77–88.

Preparata, F.P., *The Medial Axis of A Simple Polygon*, Lecture Notes in Computer Science: Mathematical Foundations of Computer Science, G. Coos and J. Hartmanis, editors, Springer–Verlag, 1977, pp. 443–450.

Reddy, J.M., et al., *Computation of 3D Skeletons Using a Generalized Delaunay Triangulation Technique*, Computer–Aided Design, vol. 27, No. 9, Sep. 1995, pp. 677–694.

Ricci, A., *A Constructive Geometry for Computer Graphics*, The Computer Journal, 16(2), May 1973, pp. 157–160.

Schroeder, W.J., et al., *An O(N) Algorithm to Automatically Generate Geometric Triangulations Satisfying the Delaunay Circumsphere Criteria*, Engineering with Computers, 5(3), 1989, pp. 177–193.

Scott, G.L., et al., *Using a Mixed Wave/Diffusion Process to Elicit the Symmetry Set*, Image and Vision Computing, 7(1), 1989, pp. 63–70.

Shapiro, V., *Real Functions for Representation of Rigid Solids*, Computer Aided Geometric Design, 11(2), 1994, pp. 153–175.

Shapiro, V., *Real Functions for Representation of Rigid Solids*, Cornell University, Department of Computer Science, No. TR91–1245, 1991, pp. 1–24.

Sheehy, D.J., et al., *Computing the Medial Surface of a Solid From a Domain Delaunay Triangulation*, Proceedings of the Third Symposium on Solid Modeling and Applications, C. Hoffman and J. Rossignac, editors, ACM Press, 1995, pp. 201–212.

Sherbrooke, E.C., et al., *Computation of the Medial Axis Transform of 3–D Polyhedra*, Proceedings of the Third Symposium on Solid Modeling and Applications, C. Hoffman and J. Rossignac, editors, ACM Press, 1995, pp. 187–199.

Sloan, K.R., et al., *From Contours to Surfaces: Testbed and Initial Results.* Proceedings of CHI+GI, Toronto, Canada, Apr. 1987, pp. 115–120.

Sourin, A., et al., *Function Representation for Sweeping by a Moving Solid*, Proceedings of the Third Symposium on Solid Modeling and Applications, C. Hoffman and J. Rossignac, editors, ACM Press, 1995, pp. 383–391.

Spivak, M., *A Comprehensive Introduction to Differential Geometry*, Publish or Perish, vol. 3, 1975, pp. 199–203.

Storti, D. et al., *A Tutorial on Implicit Solid Modeling*, The Mathematical Journal, vol. 2, Issue 3, Summer 1992, pp. 70–78.

Sudhalkar, A., et al., *Continuous Skeletons of Discrete Objects*, Proceedings of the Second Symposium on Solid Modeling and Applications, J. Rossignac, J. Turner, and G. Allen, editors, AC Press, 1993, pp. 85–94.

Turkiyyah, G.M., et al., *An Accelerated Triangulation Method for Computing the Skeletons of Free–Form Solid Models*, Computer–Aided Design, vol. 29, No. 1, 1997, pp. 5–19.

Widmann, R., *An Efficient Algorithm for the Triangulation of Surfaces in $IR^3$*, Preprint, Colorado State University, Department of Mathematics, Fort Collins, Colorado, 1990.

Wyvill, G., et al., *Data Structure for Soft Objects*, The Visual Computer, 2(4), 1986, pp. 227–234.

Yuille, A., et al., *3D Symmetry–Curvature Duality Theorems*, Computer Vision, Graphics, and Image Processing, 52, 1990, pp. 124–140.

CONSTRUCTING SOLID MODELS USING IMPLICIT FUNCTIONS DEFINING CONNECTIVITY RELATIONSHIPS AMONG LAYERS OF AN OBJECT TO BE MODELED

RELATED APPLICATIONS

This application is based on prior copending provisional applications, Ser. Nos. 60/018,281, 60/018,278, 60/018,292, 60/018,280, and 60/018,279, all of which were filed on May 24, 1996, and Ser. No. 60/019,075, filed on Jun. 3, 1996, the benefit of the filing date of which is hereby claimed under 35 U.S.C. § 119(e) and 120.

FIELD OF THE INVENTION

The present invention generally relates to the use of a computer for constructing geometric models of shapes, and more specifically, to producing representations of surfaces and solids corresponding to a collection of data points.

BACKGROUND OF THE INVENTION

Computer-aided methods are commonly employed for describing and analyzing the geometry of objects to be modeled and/or manufactured. While the descriptions of such objects are often generated within a computational solid modeling environment, it is also common to attempt to "import" an existing physical object into the solid modeling environment. For example, a visualization may be desired that incorporates a physical object in a computer-generated scene, or a solid model of an existing physical object may be desired to enable reproduction of the object using computer-aided manufacturing techniques. Representing the object within the solid modeling environment also allows computer-aided modifications to be performed. For example, scale models and mirror images of existing parts can be produced, and other solid modeling operations can be performed to add, remove, or modify features.

Importing the object into the modeling environment corresponds to creating a representation within the modeling environment, which corresponds to the object to be imported. This importing procedure often occurs in two steps. A collection of data points on the surface of the object is obtained (often by employing some form of scanning or coordinate measurement technology), and a solid model is constructed to fit the data. Due to the nature of many scanning devices, the surface point data are often arranged in layers or slices, and associated with each data point is an indication of the side of the point on which the object lies. This direction indication may be provided by a measurement of the surface normal at the data point or deduced from the location of the scanning device or proximal data points.

Prior art reconstruction algorithms can be broadly categorized into either surface reconstruction schemes or volume reconstruction schemes. Surface reconstruction schemes produce a surface model, usually a polygonal mesh, that closely approximates the data. One of the disadvantages of surface representation schemes is that they typically require such massive amounts of data for the vertices, edges, and faces that the storage, transmission, and modeling operations using that data become relatively expensive. Volume reconstruction schemes generate models that can be stored as a collection of primitives that are combined to produce the reconstructed object. An advantage of the volume reconstruction approach is that it produces a solid model that can easily be used or combined with other solid models to create more sophisticated shapes. The number of primitives is usually much smaller than the number of data points so that data compression is achieved and less data storage is required than in the surface reconstruction schemes.

Early reconstruction schemes involved connecting polyline planar contours to produce polygonal surface mosaics. Others have surveyed existing algorithms for cross-sectional surface reconstruction, provided a testbed for evaluating these techniques, and presented improvements on the initial divide-and-conquer approach. All of these prior art algorithms require that vertices forming one layer be paired with vertices on adjacent layers to determine the surface connectivity. One prior art technique employs smooth surface representations based on subdivision to reconstruct models from scattered range data. This procedure effectively produces accurate surface models from dense data, but the computations required are expensive (time consuming even on powerful computers). Another scheme involves the pruning of Delaunay tetrahedra to handle general topologies. This second approach generates the volume of the object (rather than just its surface) as a collection of tetrahedra. Attempts to reconstruct volumetric shape descriptions using implicit functions include a non-linear least squares minimization method that produces superquadric models, a method for reconstructing superquadric models from laser range finder data, and a "blobby" approach in which a single initial primitive is repeatedly subdivided and optimized to produce an implicit function that approximates the data.

The methods that connect the points in a data layer to form surfaces run into difficulties determining how to connect points on one layer to those on adjacent layers. The problem of determining this point-to-point correspondence between layers becomes greater with an increasing size of the data set, since the prior art techniques don't scale well and often require human intervention to resolve difficult cases. The task of connecting the points properly between adjacent layers becomes especially problematic when the layers have different topology (different numbers of connected components and/or holes). The use of Delaunay tetrahedra to approximate the volume and establish data connectivity provides a partial solution to the problem; however, the method produces tetrahedral solids that cannot accurately represent objects with smooth surfaces, and the high probability of geometric degeneracy makes Delaunay triangulation of layered data sets problematic. Other methods are limited to superquadric surfaces and require independent knowledge of the surface topology. The blobby approach is computationally expensive, may fail on certain classes of data, and is not well suited to reconstructing objects with sharp edges. Each of the methods listed above is not appropriate for dealing with layered data. Still another prior art approach employs range data to produce a probabilistic spatial occupancy model.

A technique that is an extension of the method using Delaunay tetrahedra to approximate the layered volume of an object and to establish data connectivity between layers solves the above noted problems with the prior art. Clearly, it would be desirable to automatically determine the necessary connectivity information, both for data within a single layer and between adjacent layers, and to construct a corresponding representation in the form of an implicit function possessing a level set that lies close to the data points representing the object.

SUMMARY OF THE INVENTION

In accordance with the present invention, a method is defined for constructing a model of an object to fit a set of surface point data associated with adjacent layers of the object; the surface point data include an indication of a direction away from an interior of the object in each layer. In the method, for each layer of the object, an implicit function defining an isosurface extending generally through the surface point data associated with the layer is constructed, thereby producing a plurality of implicit functions defining the layers. An object implicit. function having an isosurface that generally extends through the surface point data for the object is produced by blending implicit functions that define adjacent layers. The model of the object is then produced using the object implicit function.

Preferably, the step of constructing the implicit function for each layer comprises the step of dividing the layer into simplices that cover the layer without overlap and extend through the surface point data associated with the layer. At least some simplices that extend outside the object are removed. Hyperspheres that circumscribe the simplices in the interior of the object are defined, and the implicit function for the layer is constructed from the hyperspheres.

When the object is three dimensional, the simplices comprise Delaunay triangles, and the hyperspheres comprise two-dimensional (2D) circumcircles. When the object is four dimensional (4D), the simplices comprise tetrahedrons, and the hyperspheres comprise three-dimensional (3D) spheres.

The method further comprises the step of reducing a number of hyperspheres by replacing a selected pair of the hyperspheres with a derived hypersphere, and then forming an implicit pseudo-union of the hyperspheres. An operator is enabled to specify a merging parameter that controls selection of each selected pair of hyperspheres, and thus, controls a complexity of the implicit pseudo-union.

In addition, the method preferably includes the step of optimizing parameters used in constructing the implicit function for each layer. An operator is enabled to specify the parameters used in constructing the implicit function for each layer and to specify an optimizing function for use in constructing the implicit function for each layer.

In one preferred form of the invention, the indication of the direction is a normal to the surface of the object at the surface point data. The step of constructing the implicit function for each layer also comprises the steps of determining a connectivity of the surface point data for each layer, and constructing an approximate skeleton for each layer. The step of removing at least some simplices that extend outside the surface of the object is based on the indication of the direction away from the interior of the object included with the surface point data.

A further aspect of the present invention is directed to apparatus that include a memory in which machine instructions comprising a computer program are stored, and a processor that is coupled to the memory to execute the computer program. When executing the computer program, the processor implements functions that are generally consistent with the steps of the method discussed above.

Yet another aspect of the present invention is directed to an article of manufacture that is adapted to be used with a computer. The article includes a memory media on which a plurality of machine instructions are stored. When executed by the computer, the machine instructions cause the computer to implement functions that are also generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 15A:
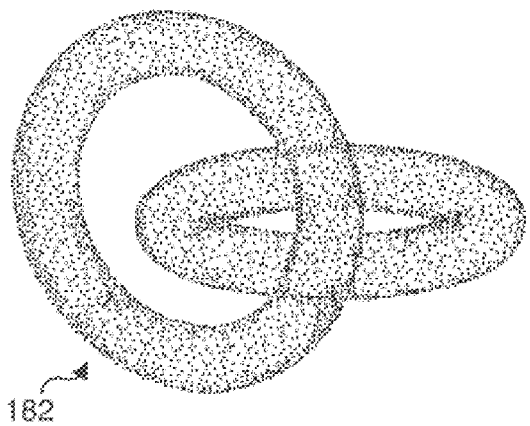
Figure 15B:
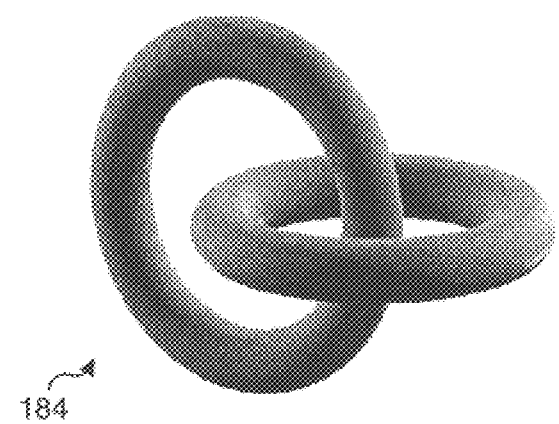
Figure 18:
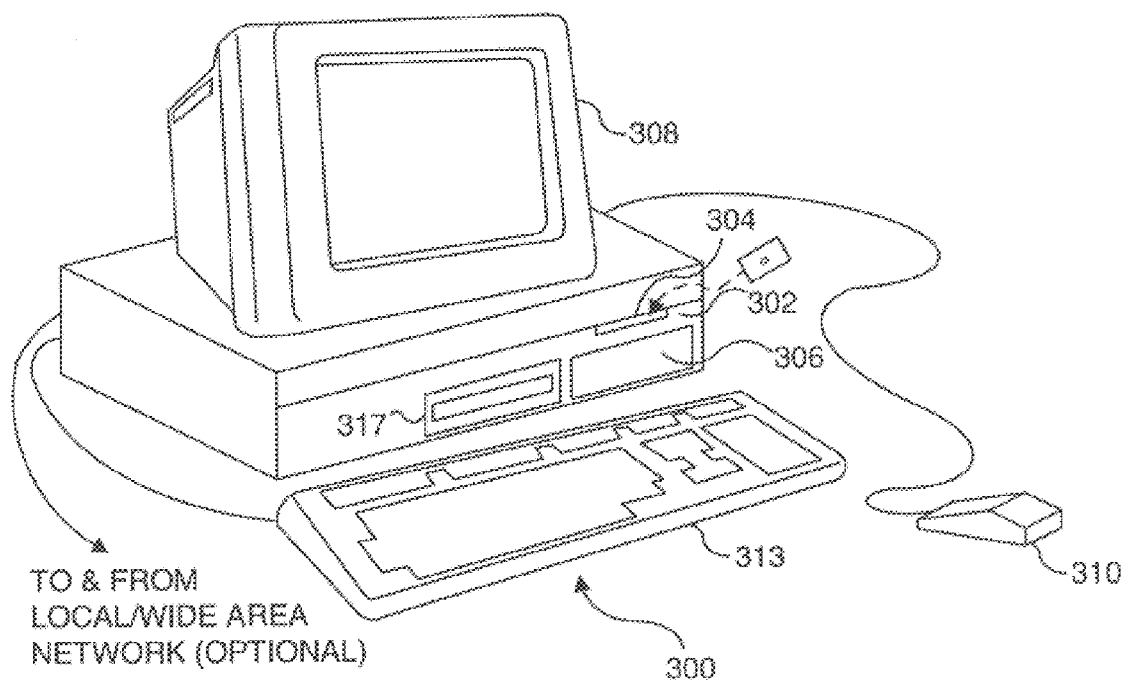
Figure 16C:
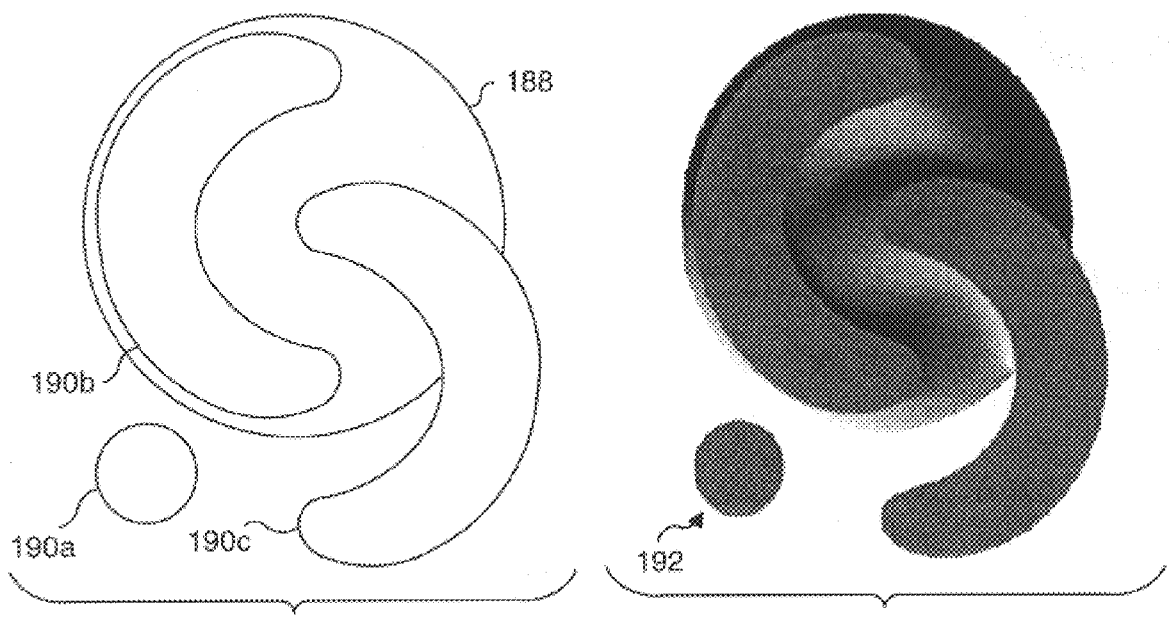
Figure 16C:
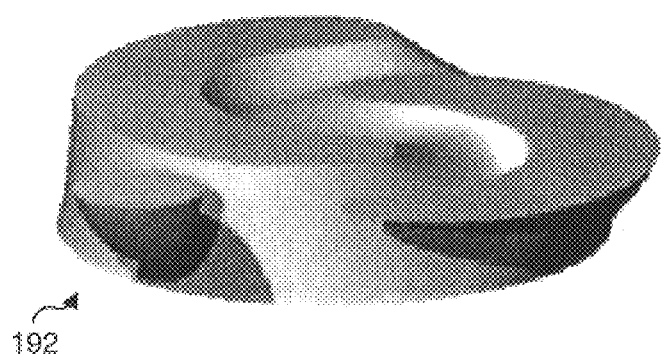
Figure 17A:
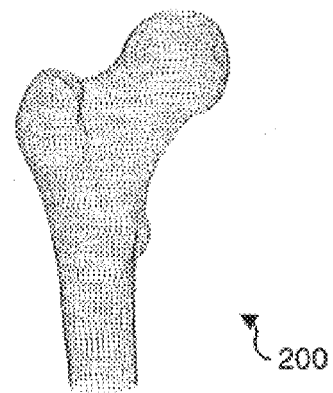
Figure 17B:
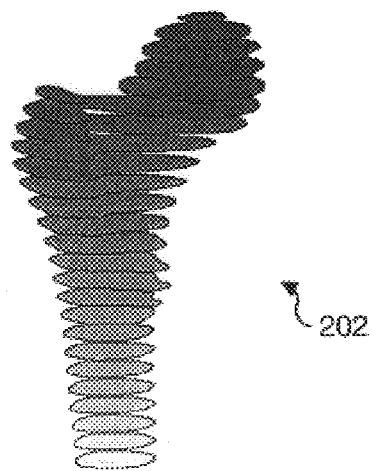
Figure 17C:
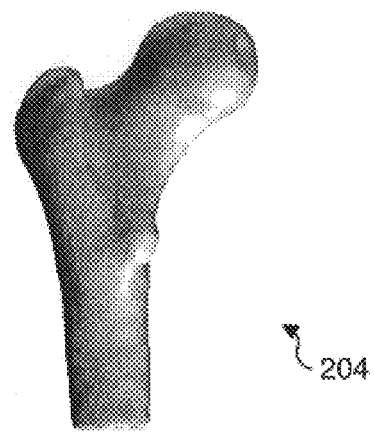

FIGS. 15A and 15B respectively illustrate points defining interlocked rings and the solids reconstructed from the points in three dimensions, providing an example of a reconstructed 3D layer for a data set in four dimensions;

FIGS. 16A, 16B, and 16C illustrate a blend between layers with different topology; it is not necessary to determine the points on the circle in the lower layer that connect to each component of the upper layer, since the blend or morph occurs between the functions defining the layers, and point correspondence is not needed;

FIGS. 17A, 17B, and 17C respectively illustrate an example set of 3D data points arranged in 2D layers, the cross-section shapes determined by the level sets of the implicit functions derived from the layered data, and the 3D solid determined by the implicit function derived from the layer functions; and FIG. 18 is a block diagram of a personal computer or workstation suitable for implementing the present invention.

DESCRIPTION OF THE PREFERRED EMBODIMENT

Figure 1:
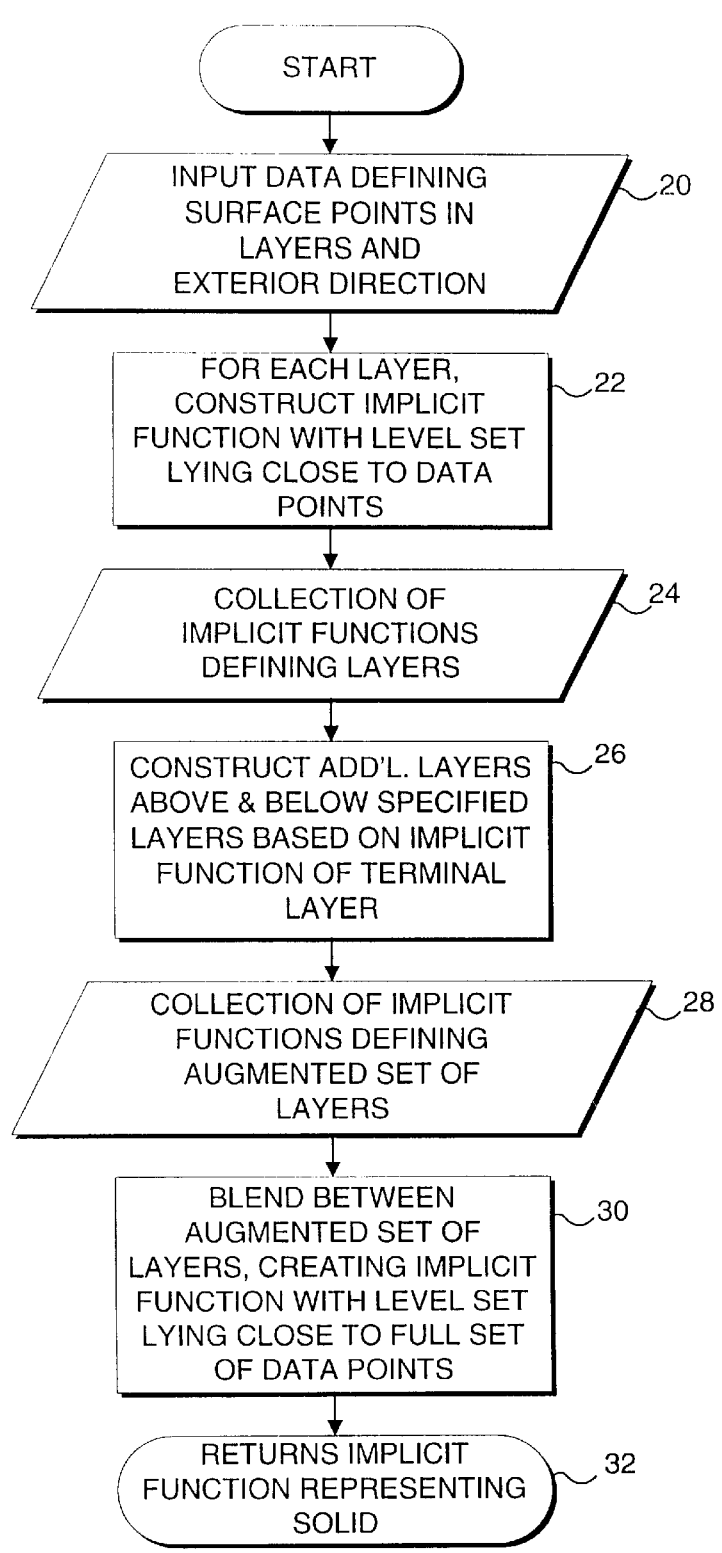
FIG. 1 is a block diagram illustrating the procedure for constructing an implicit function with level set lying close to the layered data points in accord with a preferred embodiment of the present invention.

With reference to FIG. 1, the procedure for reconstructing a solid model from layered surface data is illustrated. The first step of the procedure for reconstructing a solid model noted in a block 20 is to obtain input data that defines surface points for each layer and also indicate an exterior direction relative to each of the surface points. Typically, indication of the exterior direction will be a normal to the surface of the object. However, other alternatives for indicating the exterior direction are noted below.

In a block 22, for each layer, an implicit function is constructed with a level set that lies close to the data points for the layer. Details of this step are discussed below. After the implicit function is produced for each of the layers in block 22, the result is a collection of implicit functions defining the layers, as noted in a block 24.

As necessary, additional layers above and below the specified layers defined by the collection of implicit functions in block 24 are then constructed, based on implicit functions for each of such additional terminal layers. The step that is carried out in a block 26 is discussed in greater detail below. In general, these additional layers enable the blending of the implicit function for the layers corresponding to the collection of implicit layers in block 24 at the ends of a reconstructed model. By accumulating the implicit functions for these additional layers, a collection of implicit functions defining the augmented set of layers is produced, as indicated in a block 28. Next, a block 30 provides for blending between the augmented set of layers, creating implicit functions with a level set that lies close to the full set of data points originally provided in block 20. After the blending step is completed, the procedure returns an implicit function representing the solid, as indicated in a block 32.

Figure 2A:
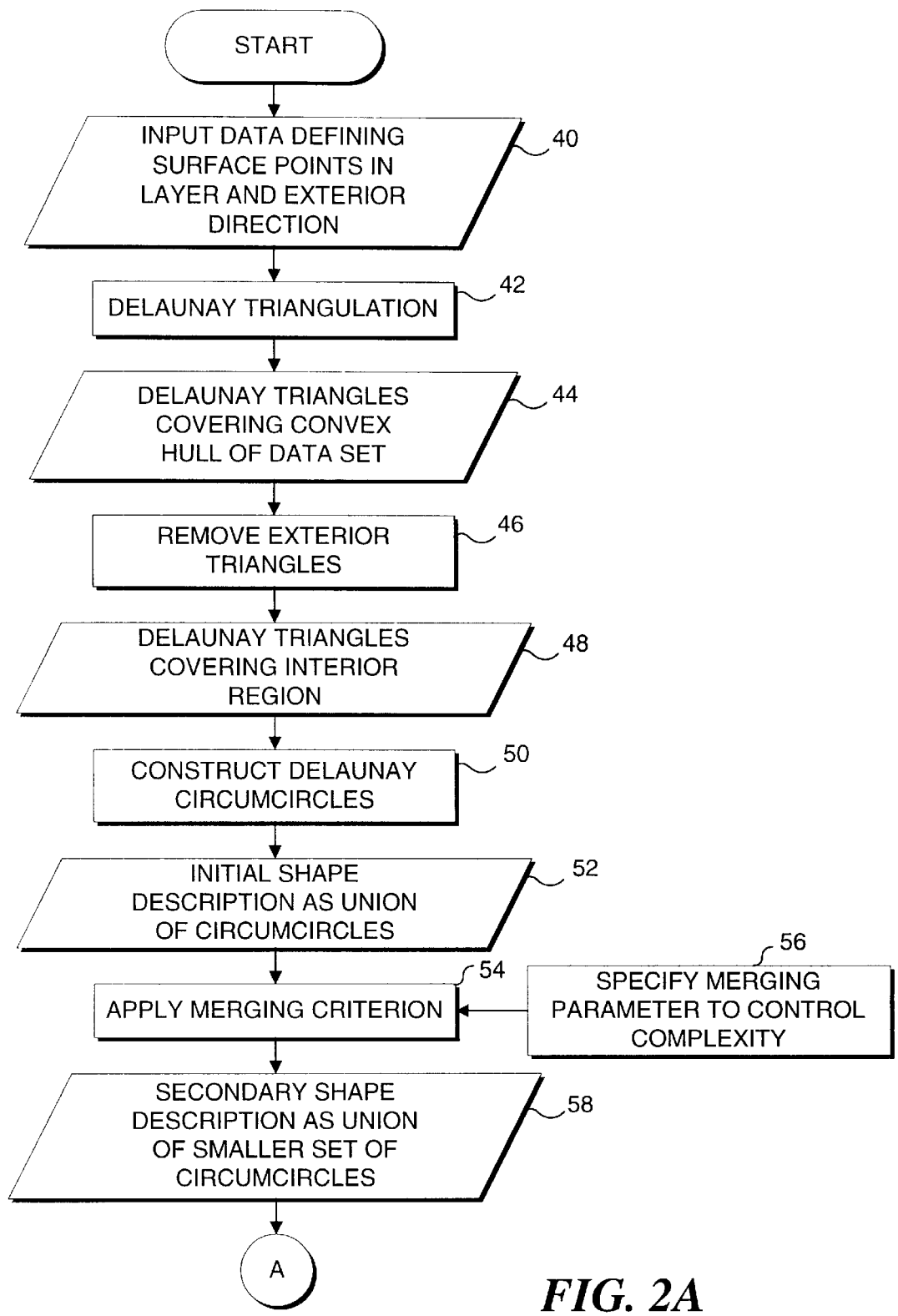
FIGS. 2A and 2B are a block diagram showing the procedure for constructing an implicit function representation for a single layer of data.
Figure 2B:
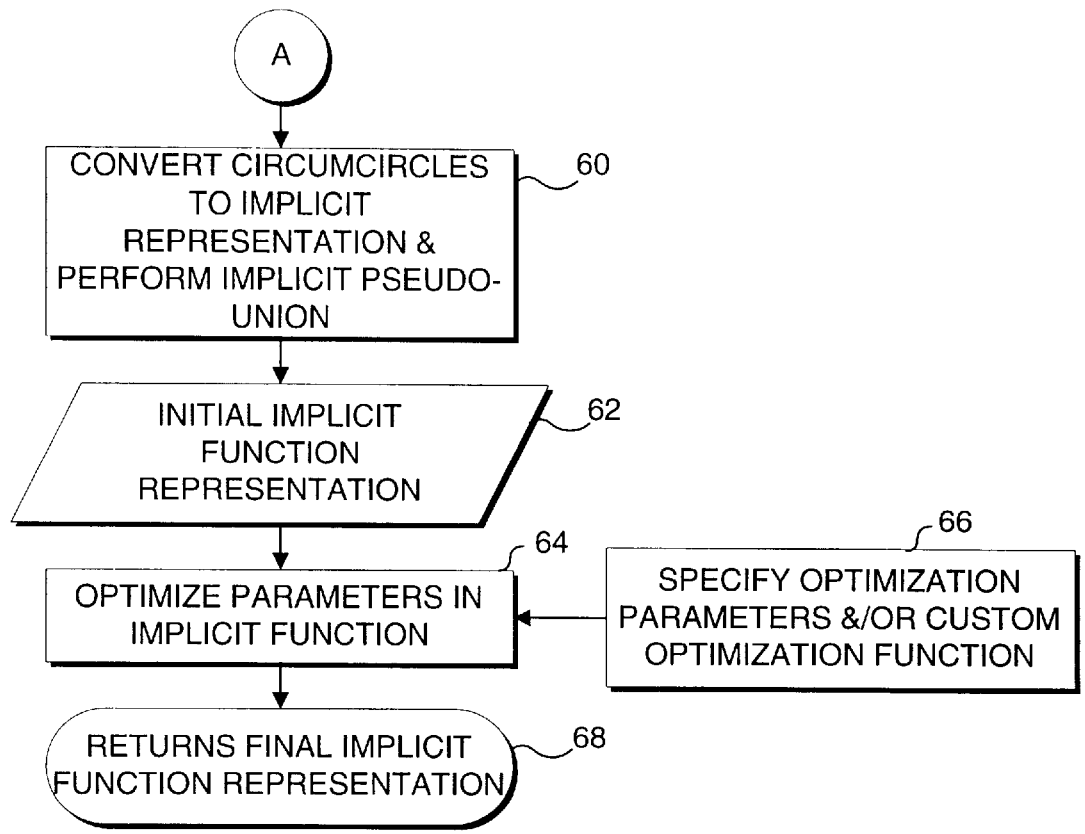

FIGS. 2A and 2B illustrate in block diagram form the steps of the procedure for constructing an implicit function possessing a level set that lies close to the data for a single layer. To make the description more readily understandable, the procedure indicated in FIG. 2 is applied to a sample 2D data set, and the intermediate steps are graphically represented in FIG. 3 and FIGS. 6–13, which are discussed below.

The step of determining an implicit function for each layer begins in a block 40 where input data defining surface points in the layer and the exterior direction away from the interior of the object at that layer for each of the surface points are provided. In a block 42, a Delaunay triangulation procedure is implemented, which provides for connecting three adjacent surface points so that no other surface point lies within a circumcircle around the resulting triangle. By implementing the Delaunay triangulation procedure, a plurality of Delaunay triangles covering the convex hull of the data set for the layer are produced, as indicated in a block 44. While it is possible that the Delaunay triangulation procedure will not produce exterior triangles, a block 46 provides for removing any Delaunay triangles that are external to the boundary of the object in the layer currently being processed. The data indicating the exterior direction are used in this step to identify exterior triangles for removal. The step implemented in block 46 produces a set of Delaunay triangles that cover only the interior region of the layer, as provided in a block 48.

Next, a block 50 provides for constructing Delaunay circumcircles around each of the Delaunay triangles that cover the interior region of the layer. A circumcircle encloses a Delaunay triangle and passes through all three vertices of the Delaunay triangle.

In a block 52, the initial shape of the object is defined as a union of the circumcircles. Because of the number of circumcircles that typically result in block 52, it is generally desirable to merge overlapping circumcircles to decimate the data. In a block 54, a merging criterion is provided that includes a merging parameter specified by a user in a block 56. The merging parameter is selected so as to control a desired complexity of the union of circumcircles. After merging the circumcircles, in a block 58, a secondary shape results having a description corresponding to the union of the smaller set of circumcircles. Continuing with FIG. 2B, a block 60 provides for converting the circumcircles to an implicit representation and performing an implicit pseudo-union. This step, as indicated in a block 62, yields an initial implicit function representation for the layer of the object. In a block 64, parameters for the implicit function are optimized using optimization parameters and/or a custom optimization function as specified by the user in a block 66. The step of optimizing has the effect of shifting the circumcircles to different positions, and/or modifying their radii so as to minimize the error between the shape specified by the initial implicit function and the actual shape of the layer. Following this optimization step, the procedure returns a final implicit function representation of the layer, as indicated in a block 68. The final implicit function representation is used in the procedure discussed above in connection with FIG. 1, to develop the collection of implicit functions defining the different layers of the object in block 24.

Figure 3:
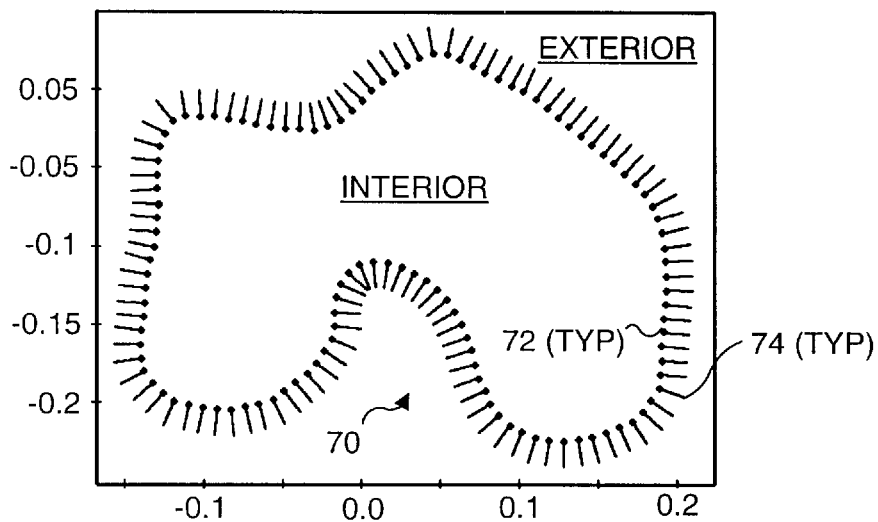
FIG. 3 is a graphical representation of a sample 2D layer of data consisting of a set of data points with associated vectors indicating an exterior direction.

FIG. 3 shows a layer 70 of data consisting of a set of points 72 with associated unit vectors 74 indicating the direction toward the exterior (or away from the interior) of the solid to be reconstructed. These vectors may be surface normals, or indicate the direction toward a line-of-sight scanner, or provide some other indication of exterior direction. If no exterior direction indicator is given, the data points in the slice are connected based on proximity, and an exterior direction indicator is derived by averaging normals of edges meeting at the data point. The role of the direction vectors is discussed below.

Figure 4:
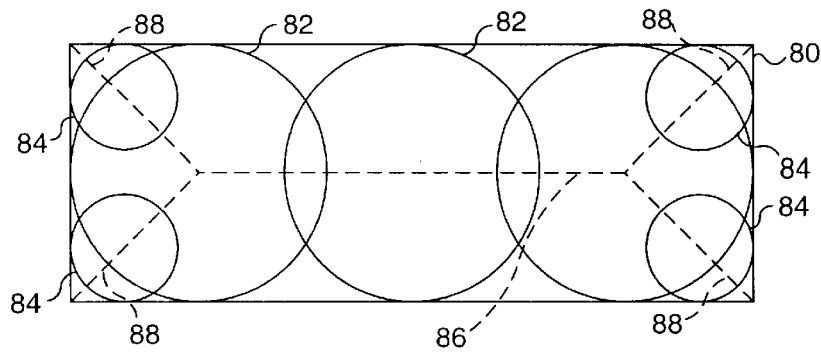
FIG. 4 shows the skeleton of a simple rectangular shape and a portion of the maximal inscribed circles within the shape.

Layer reconstruction in the present invention is based on the idea that a shape can be reconstructed from information related to its skeleton. The skeleton of a shape is the locus of centers of spheres (circles in the 2D example shown in FIG. 4, or spheres in 3D, or hyperspheres for objects of dimension greater than three) maximally inscribed in the object. In particular, the skeleton, together with the radius information specifying the size of the maximal inscribed sphere associated with each point on the skeleton, provides sufficient information to reconstruct the object. FIG. 4 shows a simple rectangular shape 80, its skeleton (dash lines 86 and 88), and some representative maximal inscribed circles (or spheres) 82 and 84. It will be apparent that the skeleton is defined by joining the centers of all such maximal inscribed circles (or spheres).

DELAUNAY TRIANGULATION

For reconstruction problems, the complete boundary of an object is not given, but a sampling of points on the boundary of the object is given. For sufficiently dense samplings, the skeleton and associated maximal inscribed circles can be approximated using Delaunay triangulation. (The Delaunay triangles become tetrahedra in three dimensions and n-dimensional simplices in general. Note however, that Delaunay triangulation algorithms cannot readily handle degenerate data sets in which too many points lie on a particular sphere. In particular, direct application of Delaunay triangulation methods to data organized in layers is likely to fail due to the presence of such degeneracy.) The Delaunay triangulation process provides a direct method to determine the connectivity of the data points. Delaunay triangles are characterized by the property that, for a given data set, the circumcircle passing through the vertices of a Delaunay triangle (i.e., three of the data points) does not contain any of the other data points. The circumcircles, i.e., circles passing through the vertices of the Delaunay triangles and enclosing the triangles, provide initial size and placement for circles to be joined, to describe the shape corresponding to the data.

Figure 5:
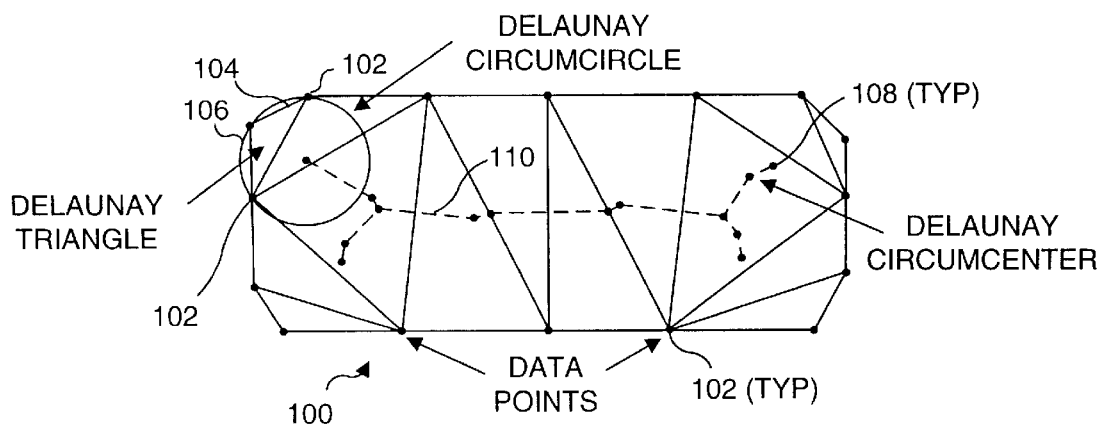
FIG. 5 illustrates a sampling of the boundary of the rectangle and the associated Delaunay triangulation, where the centers of the Delaunay triangles are connected based on adjacency, to approximate the skeleton, and the circumcircles approximate maximal circles.

FIG. 5 shows a plurality of Delaunay triangles 104 formed by joining three adjacent data points 102, an approximate skeleton 110, and an exemplary circumcircle 106 derived from the sampling of the boundary of the rectangle. Approximate skeleton 110 is obtained by joining centers 108 of the circumcircles (not shown) about others of the Delaunay triangles (also not shown).

Figure 6:
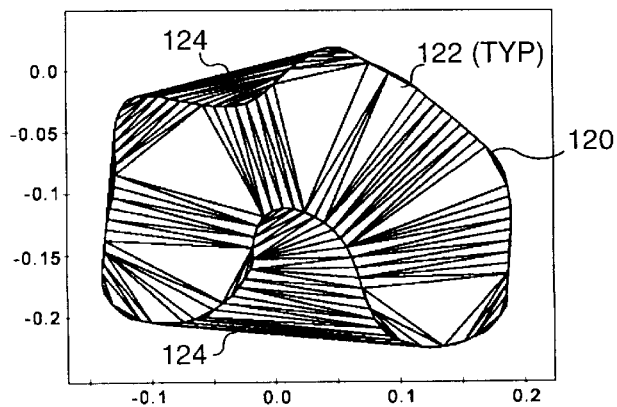
FIG. 6 shows the Delaunay triangulation that covers the convex hull of the data for the layer and establishes the connectivity of the data points.
Figure 7:
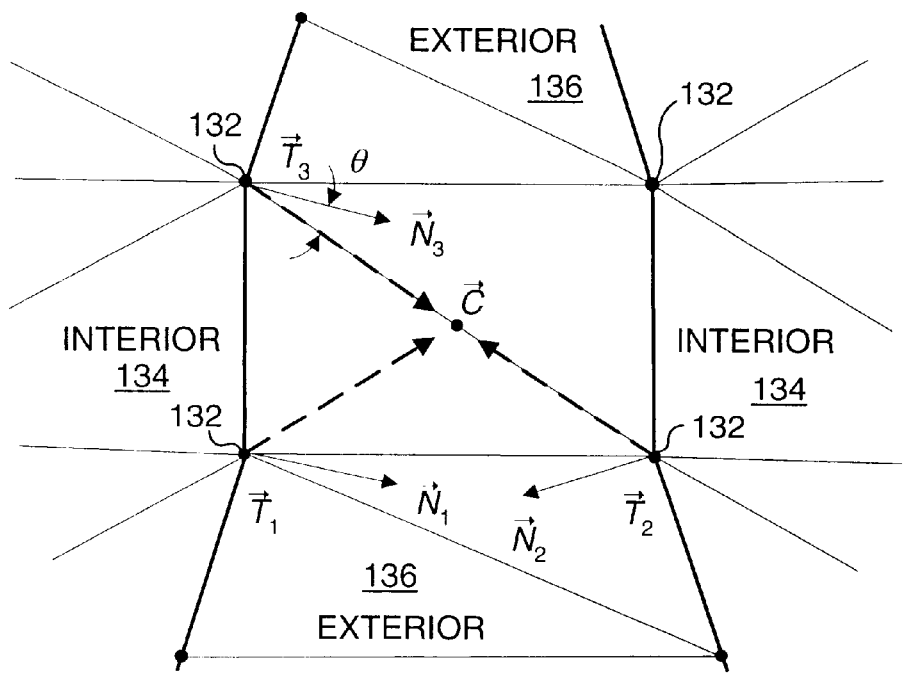
FIG. 7 illustrates a test for removal of Delaunay triangles that correspond to an exterior region.

The sample data shown in FIG. 3 requires a bit more care than the simple rectangular example of FIG. 4 because the shape corresponding to the sample data in FIG. 3 is not convex. Delaunay triangles 122 that are derived from the sample data for this shape, as shown in FIG. 6, cover the entire convex hull 120 of the data. Triangles 124, which are depicted in the lower central and upper left portions of FIG. 6, correspond to a region exterior to the shape. Such exterior triangles are identified using the test depicted in FIG. 7 and then removed.

REMOVAL OF EXTERNAL DELAUNAY TRIANGLES

The identification of external Delaunay triangles is based upon the external direction indicators. Note that a heuristic approach, which identifies most of the exterior triangles, will suffice since an optimization process will be employed to generate the final implicit representation of the layer for an object. During optimization, circumcircles associated with any remaining exterior triangles are effectively moved to the interior of the object. With reference to the example illustrated in FIG. 7, a preferred approach for heuristic exterior triangle identification proceeds as follows. For each Delaunay triangle 134 or 136, let $\vec{T}_1$, $\vec{T}_2$ and $\vec{T}_3$ denote the position of vertices 132, let $\vec{N}_1$, $\vec{N}_2$, and $\vec{N}_3$ denote the exterior direction indicators (surface normals if available), and let $\vec{C}$ denote the location of the center of the circumcircle (not shown) enclosing the Delaunay triangle. For exterior triangles, the center of the circumcircle is expected to lie towards the exterior of the shape so that the projection of the displacement from a vertex to the circumcenter onto the associated exterior direction indicator should be positive, i.e., the projection will be positive if $(\vec{C}-\vec{T}_i)\cdot\vec{N}_i > 0$, for i=1, 2, 3. Since the sampling of the surface is discrete and the exterior indicators may only approximately indicate a direction away from the interior of the object, it is possible for some vertices of external triangles 136 to violate this criterion. The heuristic criterion employed currently in the preferred embodiment is that the triangle is classified as external if any of the three vertices satisfy the exterior test. Note that removal of exterior triangles 136 allows for identification of connected components of the layer based on connectivity of interior Delaunay triangles 134. For maximum accuracy and efficiency, the procedure described below for creating an implicit function representation is applied to each connected component, and the components are then joined to form the final description of the complete layer.

Figure 8:
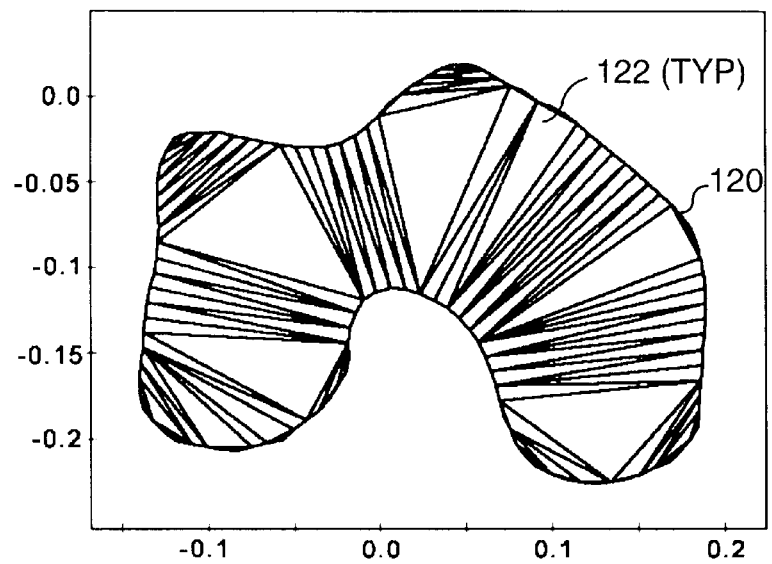
FIG. 8 shows an interior Delaunay triangulation of the sample data, i.e., the original Delaunay triangulation with exterior triangles removed, where the interior Delaunay triangles provide a first approximation of the shape corresponding to the layer of data.
Figure 9:
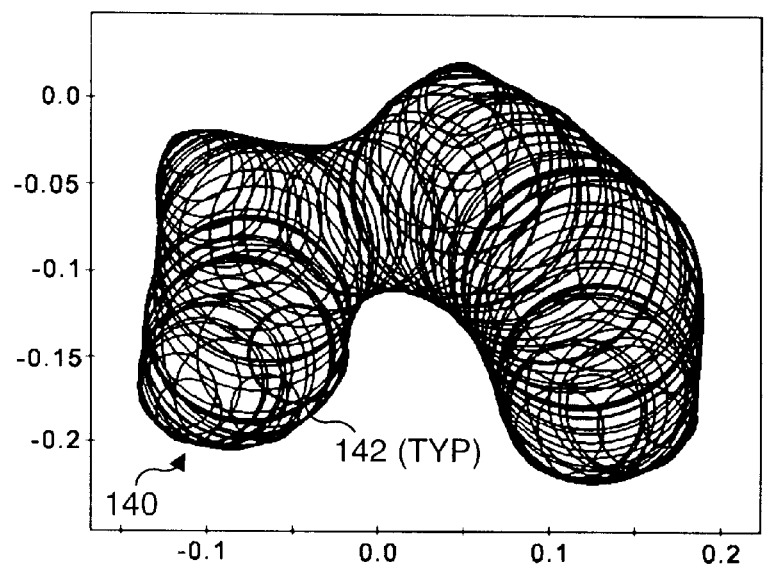
FIG. 9 illustrates the set of circumcircles, i.e., the circles determined by the vertices of each interior Delaunay triangle, where the union of the interiors of the circumcircles provides a second approximation of the shape corresponding to the data layer.

FIG. 8 shows the interior triangle set (containing only interior Delaunay triangles 122) obtained by removing external Delaunay triangles 124 (shown in FIG. 6) that resulted the Delaunay triangulation of the sample data set. The next step is to produce circumcircles for each interior Delaunay triangle 122. FIG. 9 shows the resulting collection 140 of circumcircles 142, each of which is determined by the vertices of one of interior Delaunay triangles 122 and contains no other data point. The union of the interiors of the circumcircles provides an approximation of the shape corresponding to a discrete version of skeleton-based reconstruction.

Merging Circumcircles

Frequently, so many circumcircles (one for each interior Delaunay triangle) are obtained that the data storage capacity needed for the representation is undesirably large. To obtain a more compact representation, circumcircles that exhibit significant overlap are replaced by a single circumcircle having a size and position determined by the sizes and positions of the overlapping circumcircles. A measure of overlap is computed for each pair of circumcircles, and pairs with the largest overlap are replaced by a single circumcircle until a maximal overlap criteria is satisfied. In the current embodiment, an overlap parameter D is defined as the overlap width divided by twice the minimum radius of the overlapping circles:

$$D = \frac{(r_1 + r_2) - \sqrt{(x_1 - x_2)^2 + (y_1 - y_2)^2}}{2\min(r_1, r_2)} \quad (1)$$

where r indicates the radius, x and y are coordinates of the center of the circumcircle (additional coordinates are used for higher dimensional layers), and the subscripts (1 or 2) indicate the circumcircle with which the quantity is associated. A single circumcircle replaces the pair of overlapping circumcircles. In the current embodiment, the center (x', y') of the replacement circumcircle is determined by a weighted average of the center positions of the circumcircles it replaces:

$$(x', y') = \frac{(x_1, y_1)r_1^2 + (x_2, y_2)r_2^2}{r_1^2 + r_2^2} \quad (2)$$

and the radius, r', of the replacement circumcircle varies between the radius of the larger circumcircle, for complete inclusion, to the sum of the radii, when the circumcircles touch at a single point, as shown in the following equation:

$$r' = \max(r_1, r_2) + \min(r_1, r_2)\frac{\sqrt{(x_1 - x_2)^2 + (y_1 - y_2)^2}}{r_1 + r_2} \quad (3)$$

Figure 10:
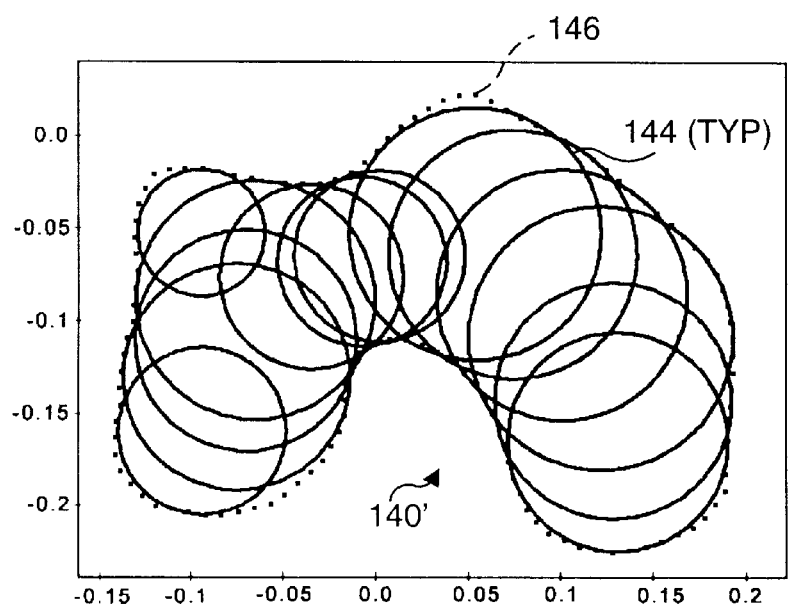
FIG. 10 shows a reduced set of circles that approximate the layer's shape, obtained by applying a merging procedure, and provides a compact description of the layer shape.

An overlap limit, $D_{max}$, is a merging parameter (as indicated in block 56 of FIG. 2A) that can be adjusted by the user to control the size and complexity of the representation that is produced by merging the circumcircles in this manner. FIG. 10 shows a reduced set 140' of circumcircles 144 obtained by merging the interior circumcircles for the sample data set.

Pseudo-Union of Circumcircles

After this decimation step that provides for merging circumcircles with large overlap, the remaining circumcircles cannot immediately provide an adequate representation of a smooth surface of the object layer. To obtain a smooth surface determined by the compact representation, each circumcircle 144 is converted to an implicit representation, and the implicit functions representing the circumcircles are combined to create an implicit function corresponding to a pseudo-union of the circumcircles. In the current embodiment, a circumcircle centered at $(x_i, y_i)$ with center $r_i$ is represented by the implicit function:

$$\varphi_i(x, y) = \sqrt{(x - x_i)^2 + (y - y_i)^2} - r_i \quad (4)$$

While there are an infinity of possible implicit representations for the circumcircle, the function specified above in Equation 4 has a linear manifold property, i.e., the function value increases exactly at the same rate as the radial distance from the center. Linear manifold objects have preferred characteristics for enabling equal weighting of the effects of circumcircles of different sizes and for avoiding undesired artifacts during the blending that is performed after the individual layer representations have been constructed.

Figure 11:
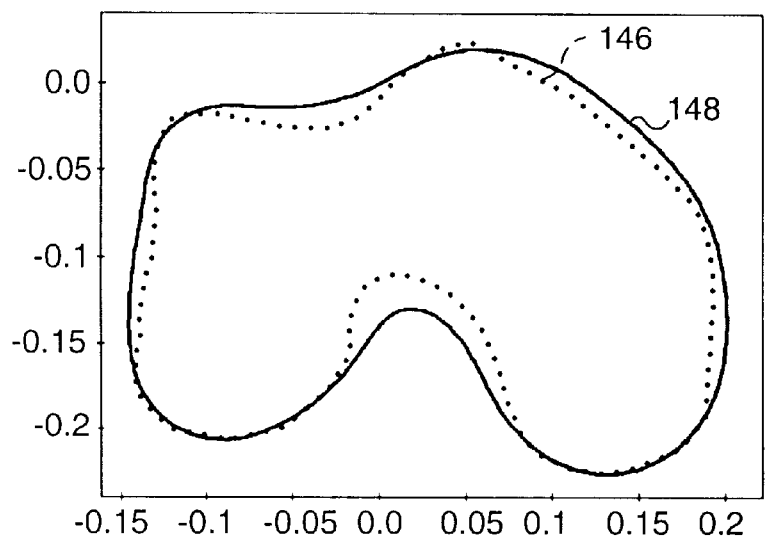
FIG. 11 illustrates the relevant level set of the implicit function corresponding to a pseudo-union of the reduced set of circles that provides a parameterized form for the implicit representation of the shape of the layer.

The reduced set of circumcircles obtained from the Delaunay triangulation via exterior triangle removal and merging are combined using an implicit pseudo-union. The pseudo-union is defined by a pseudo-union implicit function that combines the defining functions, $\phi_i$, of the reduced set of circumcircles to define a region that approximates the union of the circumcircles. In the current embodiment, the pseudo-union,f, of q circumcircles is given by:

$$f = \left\{ \sum_{i=1}^{q} \left( \frac{s_i}{s_i + \varphi_i} \right)^n \right\}^{(-1/n)} - 1 \quad (5)$$

where n is the degree of the pseudo-union that approaches the exact union as n becomes large, and the $s_i$ are scale factors, which, in the current embodiment, can all be set to unity since the circumcircle defining functions are properly constructed to never return values less than −1. This pseudo-union has a smooth level set, which encloses the set of circumcircles. Where the remaining circumcircles overlap, the pseudo-union tends to bulge further beyond the limits of the circumcircles. For smaller degree pseudo-unions, the bulging is greater and the boundary produced tends to be smoother. For higher degree pseudo-unions, the bulging is lessened. Current practice in the preferred embodiment is to use a moderate degree pseudo-union (n=64) and to employ null circles to approximate sharp corners as described below. FIG. 11 shows a pseudo-union 148 of the reduced set of circles from FIG. 10. A dotted line 146 indicates the actual shape of the object.

While the initial pseudo-union resembles the shape described by the data (dotted line 146), the accuracy may not be sufficient. However, the implicit function defining the pseudo-union also provides a very appropriate functional form for describing the shape of the layer, and a more accurate representation is obtained by optimizing the parameters in that function. (Since the parameters in the pseudo-union correspond to the center coordinates and radii of the reduced set of circumcircles, it is possible to think of adjusting the circumcircle positions and sizes; but, due to the approximate nature of the pseudo-union, this way of thinking is not always helpful. The circumcircles are not adjusted individually, but collectively through the pseudo-union, so a final "adjusted" circumcircle may indeed lie further from the data points than it did before adjustment to minimize the overall error.) The adjustment process is aimed at minimizing a measure of the error in the approximate representation. The measure of error is characterized by a cost function. The cost function can depend on: (a) the distance from the data points to the level set, (b) the value of the implicit function at the data points, (c) the discrepancy between the normal vectors (if the normal vectors are given), and (d) the normal to the implicit function at the data points, surface curvature properties, and other characteristics of the shape, which are of significance to the user. The parameters and functional form of the cost function are the second input specified by the user, as shown in block 66 of FIG. 2B. This input provides some control of computation time and resulting surface properties of the reconstructed model.

Optimizing to Minimize Error of Pseudo-Union

Figure 12:
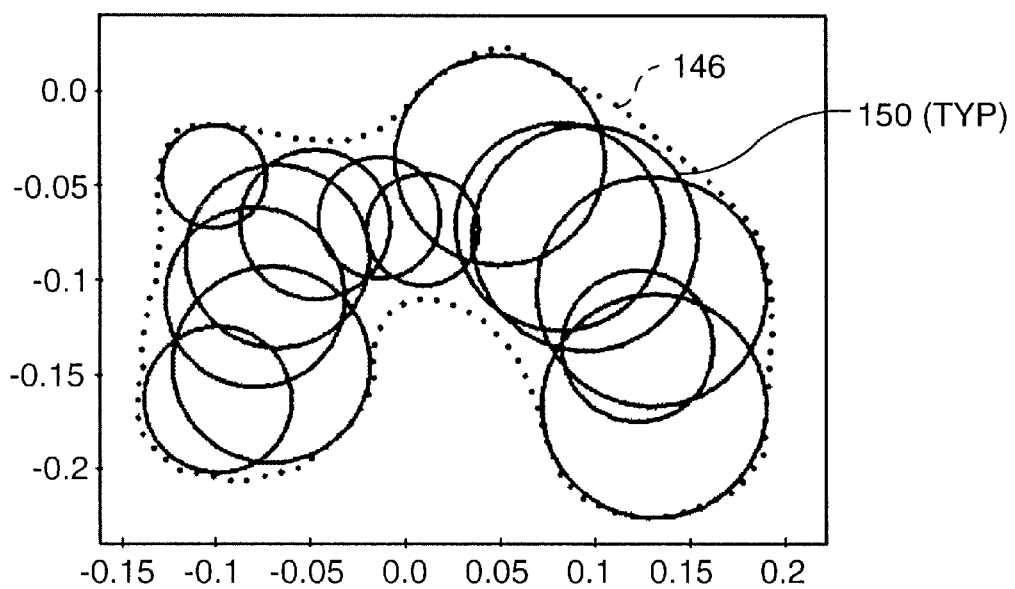
FIG. 12 shows the configuration of the set of circles after an optimization step is performed on the parameters determining the circles, i.e., their radii and center coordinates.

FIG. 12 shows the final configuration of circumcircles 150 obtained by optimizing the parameters describing the circumcircles in FIG. 10. To simplify use of the invention and to avoid artifacts caused by exterior direction indicators that do not accurately approximate surface normals, the current preferred embodiment employs as a default cost function, $C_{ave}$, the average of the squared values of the pseudo-union function at the m data points for the layer:

$$C_{ave} = \frac{1}{m} \sum_{i=1}^{m} [f(x_i, y_i)]^2 = \quad (6)$$

$$\frac{1}{m} \sum_{i=1}^{m} \left[ \left\{ \sum_{j=1}^{q} \left( \frac{1}{1 + \varphi_j(x_i, y_i)} \right)^n \right\}^{(-1/n)} - 1 \right]^2 = \vec{f}^T \vec{f}$$

with n=64, where $\vec{f}$ indicates a column vector whose entries are the implicit function values at the m data points in the layer.

In the current preferred embodiment, the parameter values that minimize the cost function are obtained using the Levenberg-Marquardt algorithm. While this method extends directly to higher dimensions, the 2D version, which is appropriate for the example layer presented, is described to provide a clearer explanation and illustration of the technique.

The Levenberg-Marquardt algorithm includes steps expressed in the following pseudo-code:

input $\vec{X}_o$, tol
set $k = 0$, $\mu_o = 0.01$, $v = 2$
do
    set $\mu_k = \mu_k / v$
    do
        solve $[J_k^T J_k + \mu_k I]\vec{p}_k = -J_k^T \vec{f}_k \rightarrow \vec{p}_k$
        set $\vec{X}_{k+1} = \vec{X}_k + \vec{p}_k$
        if $C_{ave}^{k+1} > C_{ave}^k$
            set $\mu_k = \mu_k v$
        end
    while $C_{ave}^{k+1} > C_{ave}^k$
    set $\mu_{k+1} = \mu_k$, $k = k + 1$
while $\|2 J_k^T \vec{f}_k\| < tol$ where J is the Jacobian matrix of partial derivatives with a typical entry $$J_{ij} = \frac{\partial f_i}{\partial X_j},$$

$\mu$ is the Marquardt parameter that allows the algorithm to deal with singular cases, and tol is a tolerance parameter, which can be adjusted to increase the accuracy of the result at the expense of increased computing cost.

The Levenberg-Marquardt algorithm is well-suited to this application, because it is designed for nonlinear least-squares problems and can robustly handle cases when $J^T J$ is nearly singular. The Jacobian required for this embodiment can be computed efficiently by taking advantage of the special form of the derivatives of the pseudo-union function. The Levenberg-Marquardt method is, however, a small residuals method and requires an initial state near the optimum, but the method described above provides such a suitably near-optimal initial state.

Figure 13:
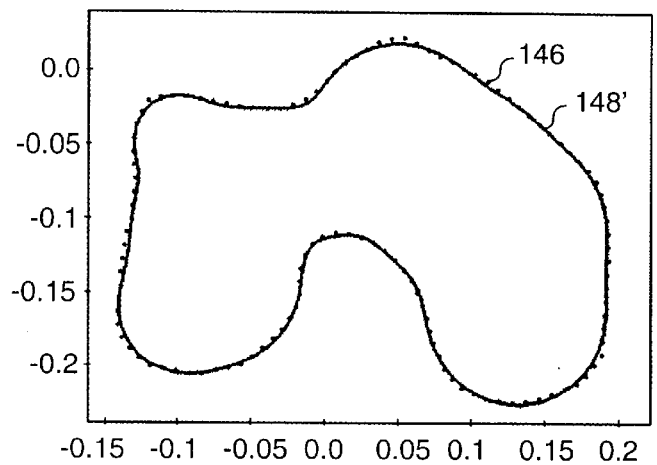
FIG. 13 shows the level set of the implicit function after the parameters have been optimized to fit the layer of data, providing the final implicit representation of the shape corresponding to the data layer.

FIG. 13 shows a final layer boundary shape 148' obtained by optimizing the pseudo-union function to minimize the sum of the squared values of the pseudo-union function at the data points in the layer. Shape 148' is shown relative to actual shape 146 to illustrate that the difference between the two shapes (error) is insignificant.

Figure 14A:
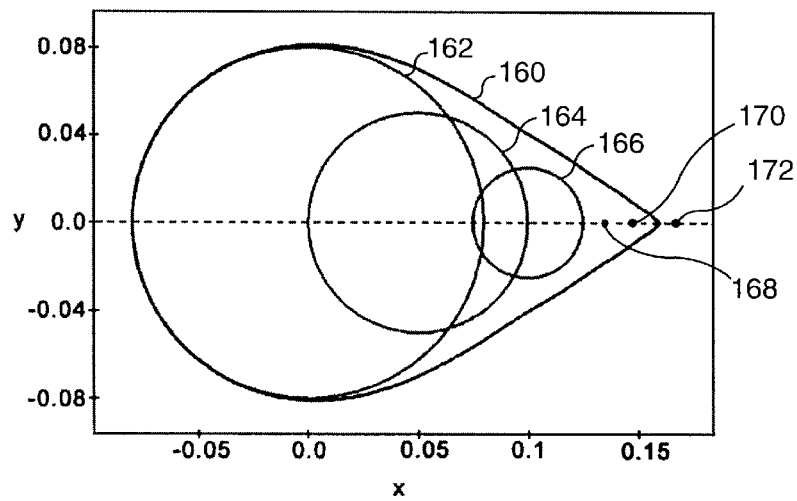
FIG. 14A shows the zero-level sets for a collection of linear manifold circles, the center points of zero or negative radii circles, and the zero-level set of the pseudo-union of the collection of circles.
Figure 14B:
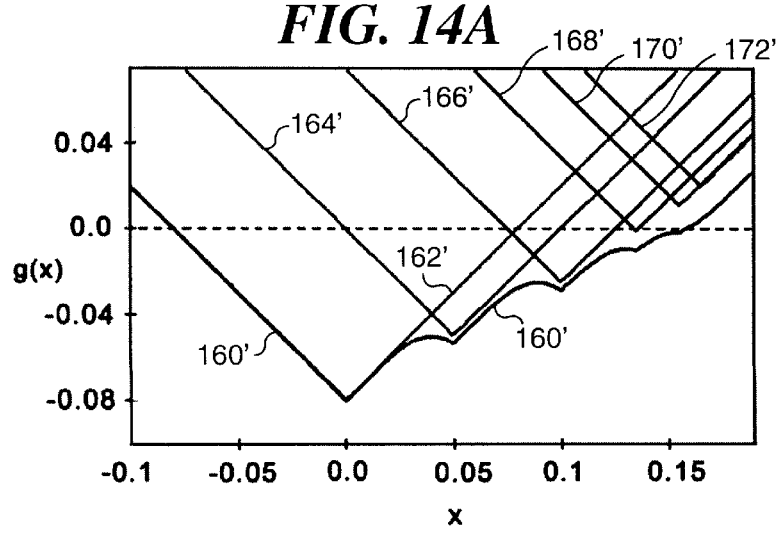
FIG. 14B shows a vertical slice through the manifold of the circles shown in FIG. 14A.

Note that while the pseudo-union tends to smooth the boundary defined by the circumcircles, objects with sharp edges can still be well approximated. FIGS. 14A and 14B show an example of a level set of a pseudo-union 160 of circumcircles 162, 164, and 166, with highly localized curvature providing a good approximation of a sharp corner at the edge on the right in FIG. 14A. No special procedure is required in this case; the adjustment procedure produces a null circumcircle by adjusting the radius until it becomes zero or negative. Each null circumcircle, by itself, defines no interior but combines with the other circumcircles to produce the appropriate localized curvature feature in the pseudo-union. In FIG. 14B, functions 162', 164', and 166' define circumcircles with positive radii, while functions 168' and 170' define null circumcircles with zero or negative radii.

For 3D layers of a 4D data set, the same procedure is applied, but tetrahedra and circumspheres replace the triangles and circumcircles. (In higher dimensions, the procedure employs simplices and hyperspheres.) FIG. 15B shows an example of a solid layer comprising interlocking rings 184 that is reconstructed from a 3D data set 182 shown in FIG. 15A.

Blending between the Implicit Functions for Adjacent Layers

After constructing implicit representations of each layer, the layer representations are combined using a blending or morphing procedure to construct the final solid with an interpolant or spline. FIGS. 16A–16C show a simple example of interpolating to construct a solid 192 spanning two adjacent layers, including a layer 188 and a layer comprising three disjoint connected components 190a, 190b, and 190c. The solid is constructed by interpolating between the implicit functions defining the upper and lower layers. In this example, the interpolation between the layer functions is linear and the layers, defined by $f_1$ and $f_2$ respectively, are located at $z=z_1$ and $z=z_2$, respectively. The implicit defining function for the solid is then given by:

$$blend = \max[(z - z_1)f_1(x, y) + (z_2 - z)f_2(x, y), z_1 - z, z - z_2] \quad (7)$$

where the initial argument of the max function gives the interpolation and the final two arguments restrict the solid to the region between the slice heights. Despite the differences in topologies of the layers, the solid is created by interpolating between the implicit functions of each layer. It is not necessary to determine how the points on one layer should be connected to the points on the next layer.

When more than two layers of data are available, the implicit layer functions can be interpolated or combined. When the implicit layer functions are interpolated, the implicit function for the solid is identical to the layer function when evaluated on a layer. When combined using a spline, the implicit function for the solid approximates the layer function at each layer, which can improve characteristics such as surface curvature. This operation is called "blending," and the mathematical construction used is referred to as a spline. Note that an interpolant is a special case of a spline that exactly fits the specified control data, here the implicit functions defining the layers. To provide a clear example, the blending between horizontal 2D layers is used, so that the layer definitions are implicit functions of x and y. The layers are then spaced along the z-direction, referred to as height.

Blending between $\lambda$ layers located at heights $z_1$, $z_2$, . . . ,$z_\lambda$, involves a series of blend functions $b_1(z)$, $b_2(z)$, . . . , $b_\lambda(z)$, which weight the contribution of the implicit layer defining functions $f_1(x, y)$, $f_2(x, y)$, . . . , $f_\lambda(x, y)$ to determine the defining function at any intermediate height, as follows:

$$F(x, y, z) = \sum_{i=1-a}^{\lambda+a} b_i f_i \quad (8)$$

where F(x,y, z) is the implicit defining function for the constructed solid, and the role of $\alpha$ is described below. The value of F(x, y, z) provides the point classification test required of a valid solid model (i.e., the value of the weighted sum of layer functions at any point determines whether that point is inside, outside, or on the surface of the constructed solid).

One embodiment of the present invention uses an interpolating fit based on linear interpolation between the implicit functions defining the nearest layers, which is defined by the blend functions:

$$b_i(z) = \min(L_i, R_i) \qquad (9)$$

where $$L_i(z) = \frac{\max(z_{i-1}, \min(z_i, z)) - z_{i-1}}{z_i - z_{i-1}}, \qquad (10)$$

$$R_i(z) = \frac{z_{i-1} - \max(z_i, \min(z_{i+1}, z))}{z_{i+1} - z_i}$$

so that each blend function is tent-shaped with local support extending from $z_{i-1}$ to $Z_{i+1}$.

Since the linear interpolant produces discontinuity in the surface normals at the layers that appears as an artificial ridged texture on the constructed solid, a non-interpolating blend is used to produce solids that can possess smooth surfaces. A further embodiment employs blend functions constructed from pieces of cubic polynomials according to:

$$b_i = \begin{cases} \hat{R}_i; & i = \lambda - (a-1) \\ \min(\hat{L}_i, \hat{R}_i); & 1 - (a-1) < i < \lambda + (a-1) \\ \hat{L}_i; & i = \lambda + (a-1) \end{cases} \qquad (11)$$

where $$\hat{L}_i(z) = \qquad (12)$$
$$(z_{i-a} - z_i)^3 [\min(\max(z, z_{i-a}), z_i) - z_{i-a}]^2 [2\min(\max(z, z_{i-a}), z_i) + z_{i-a} - 3z_i]$$

$$\hat{R}_i(z) = \qquad (13)$$
$$(z_{i+a} - z_i)^3 [\min(z_{i+a}, \max(z, z_i)) - z_{i+a}]^2 [2\min(z_{i+a}, \max c(z, z_i)) + z_{i+a} - 3z_i]$$

which have local support from $Z_{i-\alpha}$ to $z_{i+\alpha}$.

FIG. 17A shows a set of layered data 200, a selection of the reconstructed layers 202, and the solid model 204 corresponding to the implicit function obtained by the piecewise cubic polynomial spline with $\alpha=2$, so that the nearest five layers contribute to the blend at a particular height, z, which is vertical relative to the drawings. Computing the implicit function at the topmost or bottom-most height then requires a contribution from $\alpha$ additional layers above and below the given layers. Suitable definitions for the additional layers are constructed based on the implicit definition of the terminal layers, and a specified end condition such as constant layer shape or null layer shape. For the example shown, the bottom layer is located in a region where the layer shape is not changing significantly. Constant cross-section shape is then specified at the lower end and approximated by replicating the implicit function of the terminal layer (at $z=z_\lambda$) $\alpha$ times (here twice). The replicated layers (not shown) are placed below the lowest existing stack of layers so that the spline can be properly evaluated at the lower end of the stack. The extended stack can then be truncated by intersecting the spline with the half-space above $z=z_\lambda$, yielding the defining function:

$$F(x, y, z) = \max\left(\sum_{i=\lambda-a}^{\lambda+a} b_i f_i, -(z - z_\lambda)\right) \qquad (14)$$

At the upper layer, the area of the layer shapes becomes small and the object terminates. Thus, the appropriate end condition is zero cross-sectional area, but this end condition must be applied appropriately. The layers above the stack should be null, i.e., have no area, but they should be chosen so that the spline function that defines the solid changes smoothly. Sudden changes in the function can introduce artificial features or eradicate features present in the input data. To create defining functions for null sections that produce a smooth spline defining function, the implicit function for the terminal layer is replicated and a constant is added to raise the graph of the function. By adding a constant that is chosen to be greater than the minimum value of the defining function of the terminal layer, the resulting function will always be positive and the associated layer will have no interior points (i.e. the layer is null). Null layers (not shown) obtained by raising the defining function of the terminal layer are accumulated on top of the stack until the spline can be evaluated where the resulting object terminates near the top layer of the data.

An alternative embodiment improves the efficiency of constructing the implicit function to define layers of some shapes. Instead of removing the external Delaunay simplices and constructing an implicit function to fit the remaining internal Delaunay simplices, an implicit function can instead be constructed to fit the entire set of Delaunay simplices, which cover the convex hull of the layer, and additional implicit functions can be constructed to fit the connected components of the Delaunay simplices that are identified as external. The implicit function defining the layer is then constructed as an implicit pseudo-difference of the convex hull implicit function and the implicit functions for the connected components of the collection of external simplices. The identification of external simplices and the construction of an implicit function to fit a specified collection of simplices is performed as described above.

System for Implementing the Reconstruction of an Object

With reference to FIG. 18, a generally conventional personal computer 300 is illustrated, which is suitable for use in connection with practicing the present invention. Alternatively, a corresponding workstation on a local area network may be used for executing machine instructions comprising a computer program that causes the present invention to be executed. Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer, and for graphically representing models of objects produced by the present invention. A mouse 310 (or other pointing device) is connected to a serial port (or to a bus port) on the rear of processor chassis 302, and signals from mouse 310 are conveyed to the motherboard to control a cursor on the display and to select text, menu options, and graphic components displayed on monitor 308 by software programs executing on the personal computer. In addition, a keyboard 313 is coupled to the motherboard for user entry of text and commands that affect the running of software programs executing on the personal computer.

Personal computer 300 also optionally includes a compact disk-read only memory (CD-ROM) drive 317 into which a CD-ROM disk may be inserted so that executable files and data on the disk can be read for transfer into the memory and/or into storage on hard drive 306 of personal computer 300. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for constructing a model of an object to fit a set of surface point data associated with adjacent layers of the object, said surface point data including an indication of a direction away from an interior of the object in each layer, comprising the steps of:
    (a) for each layer of the object, constructing an implicit function defining an isosurface extending generally through the surface point data associated with the layer, thereby producing a plurality of implicit functions defining the layers;
    (b) producing an object implicit function having an isosurface that generally extends through the surface point data for the object by blending implicit functions defining adjacent layers from the plurality of implicit functions; and
    (c) using the object implicit function to produce the model of the object, said model corresponding to the object.

2. The method of claim 1, wherein the step of constructing the implicit function for each layer comprises the steps of:
    (a) dividing the layer into simplices that cover the layer without overlap and extend through the surface point data associated with the layer;
    (b) removing at least some simplices that extend outside the object;
    (c) defining hyperspheres that circumscribe the simplices in the interior of the object; and
    (d) constructing the implicit function for the layer from the hyperspheres.

3. The method of claim 2, wherein the object is three dimensional, the simplices comprise triangles, and the hyperspheres comprise two-dimensional circumcircles.

4. The method of claim 2, wherein the object is four dimensional, the simplices comprise tetrahedrons, and the hyperspheres comprise three-dimensional spheres.

5. The method of claim 2, further comprising the steps of reducing a number of hyperspheres by replacing a selected pair of the hyperspheres with a derived hypersphere, and then forming an implicit pseudo-union of the hyperspheres.

6. The method of claim 5, further comprising the step of enabling an operator to specify a merging parameter that controls selection of each selected pair of hyperspheres, and thus, controls a complexity of the implicit pseudo-union.

7. The method of claim 1, further comprising the step of optimizing parameters used in constructing the implicit function for each layer.

8. The method of claim 1, further comprising the step of enabling an operator to specify the parameters used in constructing the implicit function for each layer.

9. The method of claim 1, further comprising the step of enabling an operator to specify an optimizing function for use in constructing the implicit function for each layer.

10. The method of claim 1, wherein the indication of the direction is a normal to the surface of the object at the surface point data.

11. The method of claim 1, wherein the step of constructing the implicit function for each layer comprises the steps of determining a connectivity of the surface point data for each layer, and constructing an approximate skeleton for each layer.

12. The method of claim 2, wherein the step of removing at least some-simplices that extend outside the surface of the object is implemented based on the indication of the direction away from the interior of the object included with the surface point data.

13. Apparatus for constructing a model of an object to fit a set of surface point data associated with adjacent layers of the object, said surface point data including an indication of a direction away from an interior of the object in each layer, comprising:
    (a) a memory in which the surface point data and machine instructions comprising a computer program are stored; and
    (b) a processor coupled to the memory for executing the machine instructions comprising the computer program, said processor implementing a plurality of functions when executing the machine instructions, including:
        (i) for each layer of the object, constructing an implicit function defining an isosurface extending generally through the surface point data associated with the layer, thereby producing a plurality of implicit functions defining the layers;
        (ii) producing an object implicit function having an isosurface that generally extends through the set of surface point data for the object by blending implicit functions defining adjacent layers from the plurality of implicit functions; and
        (iii) using the object implicit function to produce the model of the object.

14. An article of manufacture for use in constructing a model of an object to fit a set of surface point data associated with adjacent layers of the object, said surface point data including an indication of a direction away from an interior of the object in each layer, comprising:
    (a) a memory media adapted to be used with the computer; and
    (b) a plurality of machine instructions stored on the memory media, said machine instructions effecting a plurality of functions when executed by the computer, including:
        (i) for each layer of the object, constructing an implicit function defining an isosurface extending generally through the surface point data associated with the layer, thereby producing a plurality of implicit functions defining the layers;
        (ii) producing an object implicit function having an isosurface that generally extends through the set of surface point data for the object by blending implicit functions defining adjacent layers from the plurality of implicit functions; and
        (iii) using the object implicit function to produce the model of the object.

15. A method for constructing a solid model of an object in three-dimensional space from surface point data that are arranged in layers, said surface point data including an indication of a direction away from an interior of the object, comprising the steps of:
(a) for each layer:
(i) constructing a plurality of Delaunay triangles that cover an area defined by the surface point data for the layer;
(ii) removing at least some of any Delaunay triangles that are exterior of the layer;
(iii) constructing circumcircles around the Delaunay triangles; and
(iv) converting circumcircles to an implicit representation of the layer;
(b) blending implicit functions representing a plurality of adjacent layers to produce an object implicit function; and
(c) representing the object with a solid model using the object implicit function.

16. The method of claim 15, wherein the step of converting the circumcircles comprises the step of forming a union of the circumcircles in the layer.

17. The method of claim 15, wherein the step of converting the circumcircles comprises the step of performing an implicit pseudo-union of implicit functions representing the circumcircles in the layer.

18. The method of claim 15, wherein the step of converting the circumcircles comprises the step of optimizing parameters in the implicit function for the layer.

19. The method of claim 18, further comprising the step of enabling an operator to specify the parameters used for optimizing.

20. The method of claim 15, further comprising the step of enabling an operator to specify a merging parameter to control a complexity of converting the circumcircles to the implicit function.

21. The method of claim 15, further comprising the steps of constructing implicit functions for each of a plurality of additional layers that extend beyond the surface point data and are adjacent to the layers, the implicit functions representing said additional layers being blended with the implicit functions of the layers to produce the object implicit function.

22. The method of claim 15, wherein the step of removing at least some of any Delaunay triangles that are exterior to the layer includes the step of identifying the Delaunay triangles that are exterior to the layer as a function of the indication of the direction away from an interior of the object.

23. Apparatus for constructing a solid model of an object in three-dimensional space from surface point data that are arranged in layers, said surface point data including an indication of a direction away from an interior of the object, comprising:

(a) a memory in which the surface point data and machine instructions comprising a computer program are stored; and
(b) a processor coupled to the memory for executing the machine instructions comprising the computer program, said processor implementing a plurality of functions when executing the machine instructions, including:
(i) for each layer:
(1) constructing a plurality of Delaunay triangles that cover an area defined by the surface point data for the layer;
(2) removing at least some of any Delaunay triangles that are exterior of the layer;
(3) constructing circumcircles around the Delaunay triangles; and
(4) converting circumcircles to an implicit representation of the layer;
(ii) blending implicit functions representing a plurality of adjacent layers to produce an object implicit function; and
(iii) representing the object with a solid model using the object implicit function.

24. An article of manufacture for constructing a solid model of an object in three-dimensional space from surface point data that are arranged in layers, said surface point data including an indication of a direction away from an interior of the object, comprising:
(a) a memory media adapted to be used with the computer; and
(b) a plurality of machine instructions stored on the memory media, said machine instructions effecting a plurality of functions when executed by the computer, including:
(i) for each layer:
(1) constructing a plurality of Delaunay triangles that cover an area defined by the surface point data for the layer;
(2) removing at least some of any Delaunay triangles that are exterior of the layer;
(3) constructing circumcircles around the Delaunay triangles; and
(4) converting circumcircles to an implicit representation of the layer;
(ii) blending implicit functions representing a plurality of adjacent layers to produce an object implicit function; and
(iii) representing the object with a solid model using the object implicit function.

* * * * *

UNITED STATES PATENT AND TRADEMARK OFFICE
CERTIFICATE OF CORRECTION

PATENT NO. : 6,100,893  Page 1 of 2
DATED : August 8, 2000
INVENTOR(S) : Ensz et al.

It is certified that error appears in the above-identified patent and that said Letters Patent is hereby corrected as shown below:

On the title page, items

| | |
|---|---|
| [75], 3rd Inventor | "Chek T. Lim, Seattle, Wash." should read --Chek T. Lim, Bellevue, Wash.-- |
| [73], Assignee | "Light Sciences Limited Partnership, Issaquah, Wash." should read --University of Washington, Seattle, Wash.-- |
| [56], U.S. Patent Documents, 3rd Reference | "5,542,036  7/1996  Schroeder et al." should read --5,542,036  6/1996  Schroeder et al.-- |
| Section [56], Other Publications, 4th Reference | "Automatic Creation" should read --Automatic Generation-- |
| Section [56], Other Publications, 8th Reference | "Professionsl" should read --Professional-- |
| Column 1, line 12 | after "119(e)" delete "and 120" |
| Column 1, line 13 | Before "FIELD OF THE INVENTION" insert the following section: |

--GOVERNMENT RIGHTS

This invention was made with government support under contract N00014-95-1-0355 awarded by the Office of Naval Research; contract DMI-9312932 awarded by the National Science Foundation; and contract 2-831 awarded by the National Aeronautics & Space Administration. The government has certain rights in the invention.--

UNITED STATES PATENT AND TRADEMARK OFFICE
CERTIFICATE OF CORRECTION

PATENT NO. : 6,100,893
DATED : August 8, 2000
INVENTOR(S) : Ensz et al

It is certified that error appears in the above-indentified patent and that said Letters Patent is hereby corrected as shown below:

Column 11, line 53            "comer" should read --corner--

Signed and Sealed this

Seventeenth Day of April, 2001

Attest:

NICHOLAS P. GODICI

Attesting Officer      Acting Director of the United States Patent and Trademark Office